United States Patent [19]
Lyon et al.

[11] 4,044,650
[45] Aug. 30, 1977

[54] MILLING ATTACHMENT FOR A LATHE

[75] Inventors: Garnet Rexford Lyon, Elmira; Ivan Richard Brown, Horseheads, both of N.Y.

[73] Assignee: Hardinge Brothers, Inc., Elmira, N.Y.

[21] Appl. No.: 649,800

[22] Filed: Jan. 16, 1976

[51] Int. Cl.$^2$ .......................... B23C 7/02; B23B 3/36
[52] U.S. Cl. ......................................... 90/14; 51/259; 82/34 R; 90/15 R; 90/DIG. 1
[58] Field of Search .......... 90/15 R, DIG. 1, 15.1 R, 90/16, 14; 51/259, 134.5, 268; 82/28 R, 34 R

[56] References Cited
U.S. PATENT DOCUMENTS

| | | | |
|---|---|---|---|
| 704,440 | 7/1902 | Croker | 82/34 R |
| 1,024,254 | 4/1912 | Garrett | 90/DIG. 1 X |
| 1,057,005 | 3/1913 | Miles | 90/DIG. 1 X |
| 1,260,271 | 3/1918 | Kramer | 90/DIG. 1 |
| 1,366,932 | 2/1921 | Pihl | 51/258 |
| 1,530,566 | 3/1925 | Lobbett | 90/DIG. 1 |
| 1,576,719 | 3/1926 | Chaplin | 90/DIG. 1 |
| 1,846,341 | 2/1932 | Jung | 51/268 |
| 2,203,162 | 6/1940 | Lee | 90/DIG. 1 X |
| 2,286,821 | 6/1942 | Libby | 51/134.5 R |
| 2,384,512 | 9/1945 | Wiken et al. | 51/268 X |
| 2,608,909 | 9/1952 | Quinn | 90/63 X |
| 2,611,220 | 9/1952 | Selby | 51/268 |
| 2,651,239 | 9/1953 | Schlagel | 90/63 X |
| 3,041,095 | 6/1962 | Layne | 82/34 R X |

Primary Examiner—Francis S. Husar
Assistant Examiner—William R. Briggs
Attorney, Agent, or Firm—Shlesinger, Arkwright, Garvey & Dinsmore

[57] ABSTRACT

A milling attachment for a lathe or the like having a base supported vertical column including a vertical dovetail slot, a block having a dovetail slidably received in the dovetail slot and a vertical adjusting screw rotatably secured to the column and passing through the block to thereby raise and lower same. The block carries a spindle having a horizontal axis of rotation extending along one side of the supporting column and further carries an electric motor which is positioned adjacent the supporting column and has an axis of rotation which is horizontal and extends perpendicularly to the spindle axis. The block, spindle and motor are locked at a selected vertical position by means of a hand screw which extends through the vertical column dovetail slot into the dovetail wherein it is threaded to a T-nut slidably received within a vertical slot.

15 Claims, 12 Drawing Figures

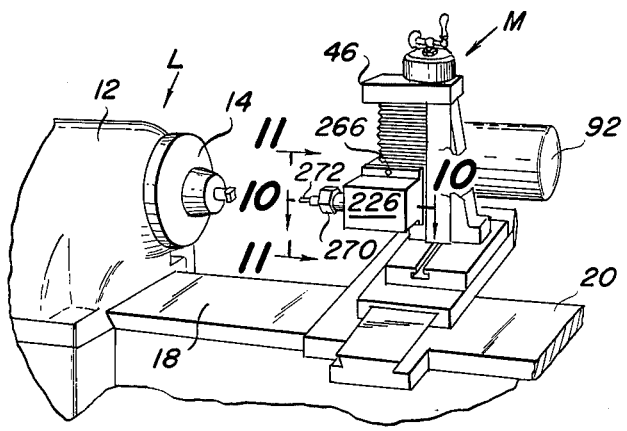
Fig. 9
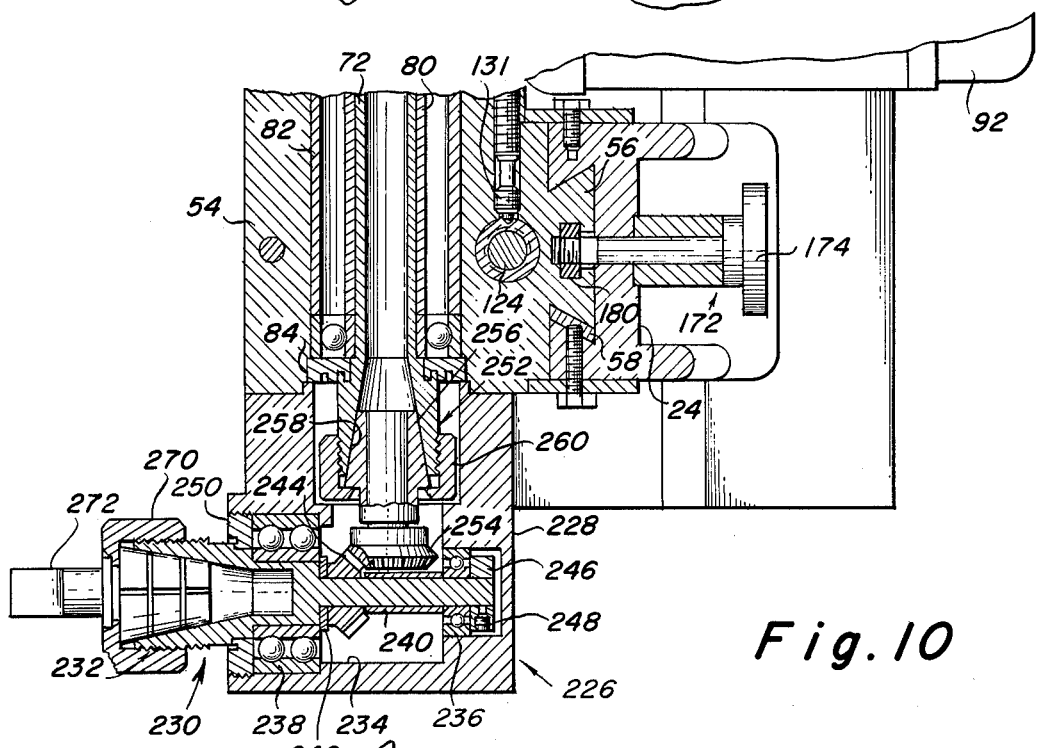
Fig. 10
Fig. 11

MILLING ATTACHMENT FOR A LATHE

BACKGROUND OF THE INVENTION

This invention relates to a milling attachment which is adapted to be mounted to the cross slide of any standard metalworking lathe such that milling operations or other operations such as boring, polishing, sawing, grinding and tapping can be performed on a workpiece which is held in the chuck or between the chuck and tailstock.

One of the primary concerns with milling attachments for lathes is the ability to position them accurately relative to the workpiece and assure that they remain in this position during the milling operation. Since the attachment is normally mounted on either the cross slide or carriage of the lathe and the attachment spindle raised or lowered to achieve the desired vertical positioning, one technique for assuring that the vertical position of the tool does not change during the milling operation is to lock the spindle block or housing to the supporting structure. In U.S. Pat. No. 2,497,735 to McCullough, for example, the spindle housing is locked in adjusted vertical position by means of wedge-shaped members drawn together by a threaded rod against two of the supporting posts. It is desirable however, from the standpoint of accuracy and precision in positioning, to minimize distortion and lateral movement of the spindle housing or block and the vertical support means as they are locked together. Continued accuracy over the life of the machine also requires that as little wear as possible occurs between these two elements and that any wear which does occur can be compensated for.

A further consideration relating to milling attachments for lathes is the amount of space they occupy when mounted. Accordingly, a desirable feature is compactness and efficient use of space without sacrificing accuracy. Not only does this feature permit the use of the attachment with a wide variety of sizes and configurations of lathes, but permits other lathe operations to be performed without completely removing the milling attachment.

Further examples of prior art milling attachments are U.S. Pat. No. 2,453,315 to Harbison and British Pat. No. 676,719 to Powell.

OBJECTS OF THE INVENTION

It is an object of this invention to provide a milling attachment for a lathe wherein the spindle may be accurately locked at a determined vertical position without distortion of the mating parts or movement of the spindle from its preset position.

A further object of this invention is to provide a milling attachment for a lathe whereby undue wear between the mating parts of the vertically adjustable spindle block and the stationary supporting column is minimized.

Another object of the invention is to provide a milling attachment for a lathe which is compact and adaptable to a wide variety of lathes without the sacrifice of accuracy or precision.

It is a further object of the invention to provide a milling attachment which may be mounted on and removed from a standard metal-working lathe quickly and easily.

Yet another object of the invention is to provide a milling attachment for a lathe capable of precision dial adjustment of on lathe center or across lathe center machining.

A still further object of the invention is to provide a milling attachment for a lathe wherein the vertical adjustment feed screw is enclosed and protected from coolant, metal chips and shavings and other foreign matter by a flexible way cover.

Another object of the invention is to provide a milling attachment for a lathe wherein the spindle block is slideably connected to the supporting column by means of a dovetail slide having an adjustable gib.

A still further object of the invention is to provide a face milling attachment for a lathe capable of rapid change from machining across the lathe center line to machining in line with the lathe center line by means of an easily attached 90° auxiliary spindle.

Yet another object of the invention is to provide a milling attachment for a lathe wherein accidental starting of the lathe spindle is precluded by means of an interlocking headstock spindle pin.

SUMMARY OF THE INVENTION

A milling attachment for a lathe or the like comprising a base mounted vertical supporting column including a first interlocking element, a block having a second interlocking element in interfitting engagement with the first element and movable relative thereto in the vertical direction, the block including a horizontal bore extending in a first direction, a tool carrying spindle rotatably received in the bore and extending along one side of the supporting column, a motor mounted to the block and positioned adjacent the supporting column, the motor having an axis of rotation and output shaft collinear therewith which are horizontal and extend perpendicularly to the first direction, gearing operatively connected between the output shaft and spindle for rotating the spindle, vertical adjusting means associated with the supporting column for raising and lowering the block, and means passing through the first and second interlocking elements for clamping the elements together to thereby lock the block to the supporting column at a selected vertical position.

BRIEF DESCRIPTION OF THE DRAWINGS

FIG. 9 is a reduced perspective of the lathe and attachment of FIG. 1 wherein the auxiliary face milling spindle assembly has beena attached.

FIG. 10 is a sectional view of FIG. 9 taken along line 10—10 and viewed in the direction of the arrows;

FIG. 11 is an elevational view of the face milling attachment of FIG. 9 taken along line 11—11 and viewed in the direction of the arrows.

DETAILED DESCRIPTION

Figure 1:
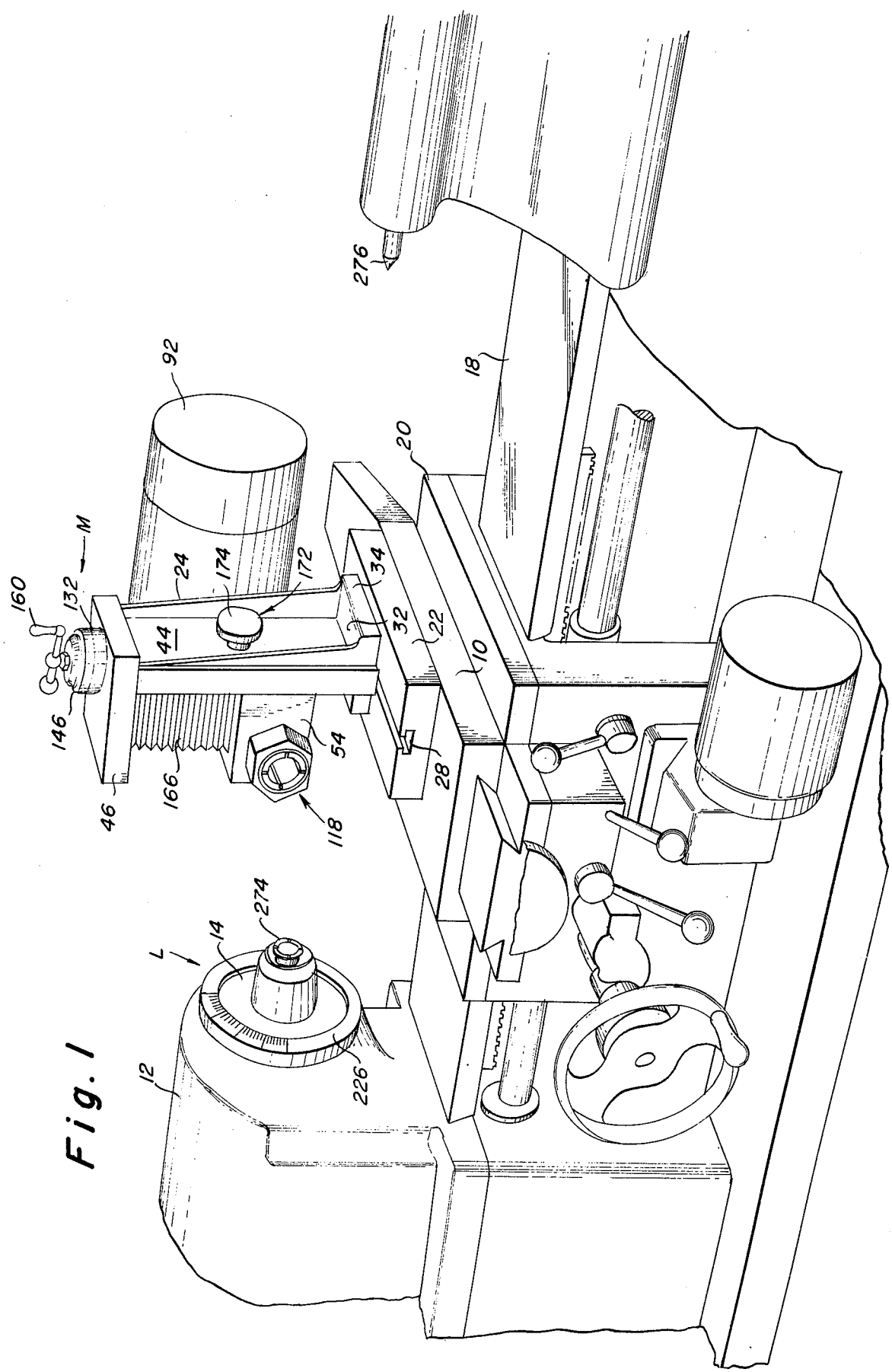
FIG. 1 is a perspective view of the milling attachment of the present invention mounted to the cross slide of a standard metal-working lathe.
Figure 2:
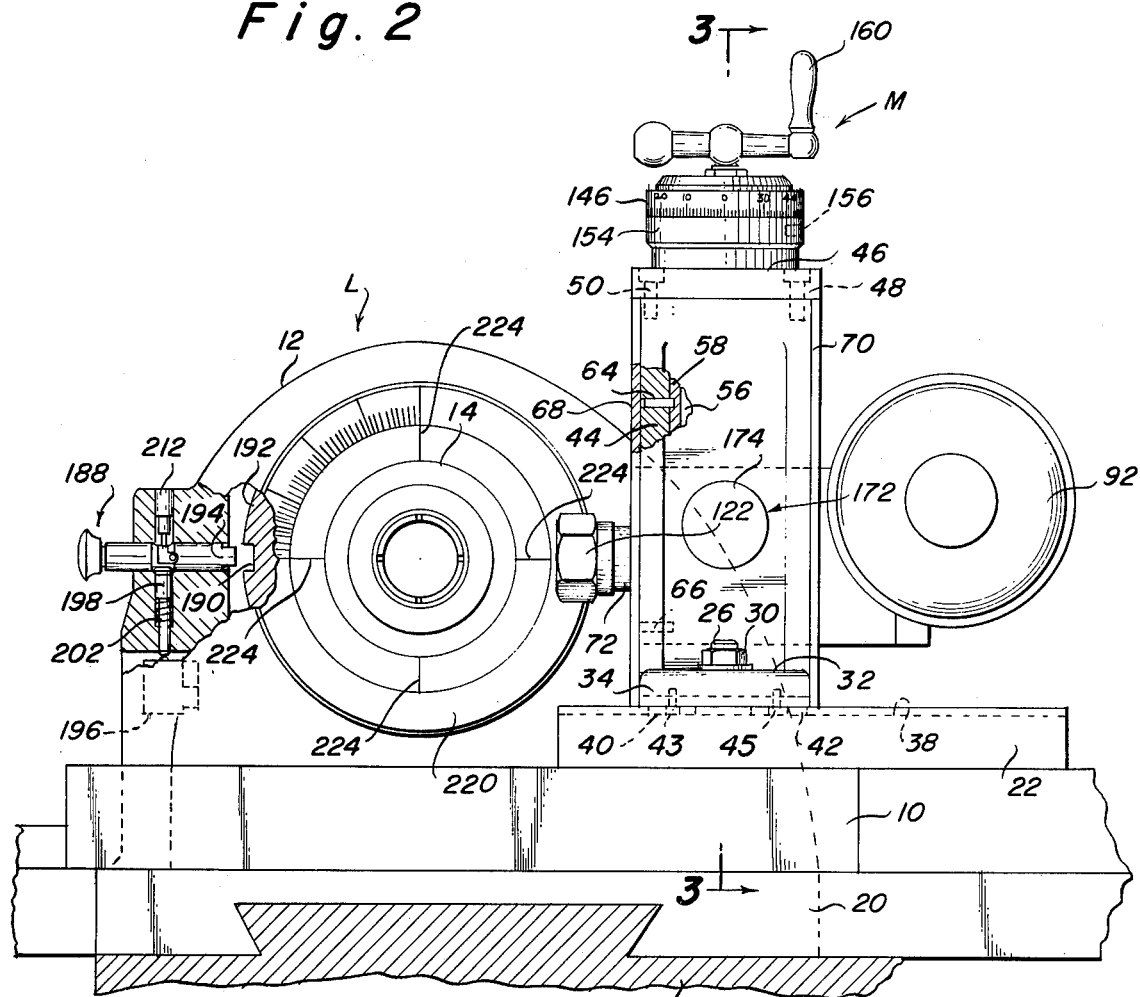
FIG. 2 is an elevational view of the headstock and milling attachment shown in FIG. 1 with portions thereof broken away to show the details of construction.

Referring to FIG. 1, the milling attachment M of the present invention is shown attached to the cross slide 10 of a standard metal-working lathe L. The lathe L includes a headstock 12 within which the spindle 14 is rotatably received and which is driven by an electric motor 16 as illustrated schematically in FIG. 12. The bed 18 of lathe L supports the carriage 20 for movement parallel to the lathe axis and the cross slide 10 is supported on carriage 20 for rectilinear movement transverse to the axis of the lathe. It should be noted that with the exception of a modification to the spindle motor interlock as will be described hereafter, the lathe L is of generally standard design.

Figure 3:
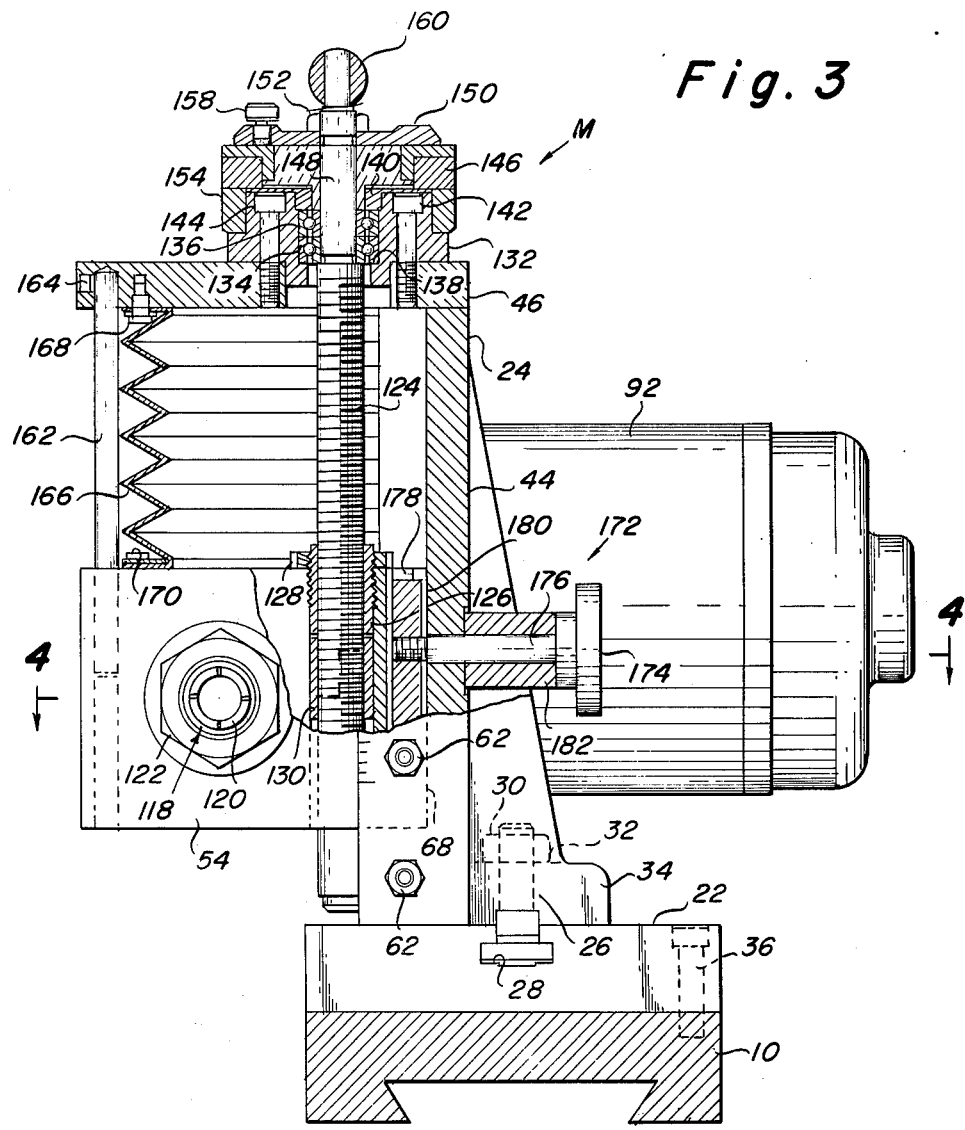
FIG. 3 is a front elevational view of the milling attachment.
Figure 4:
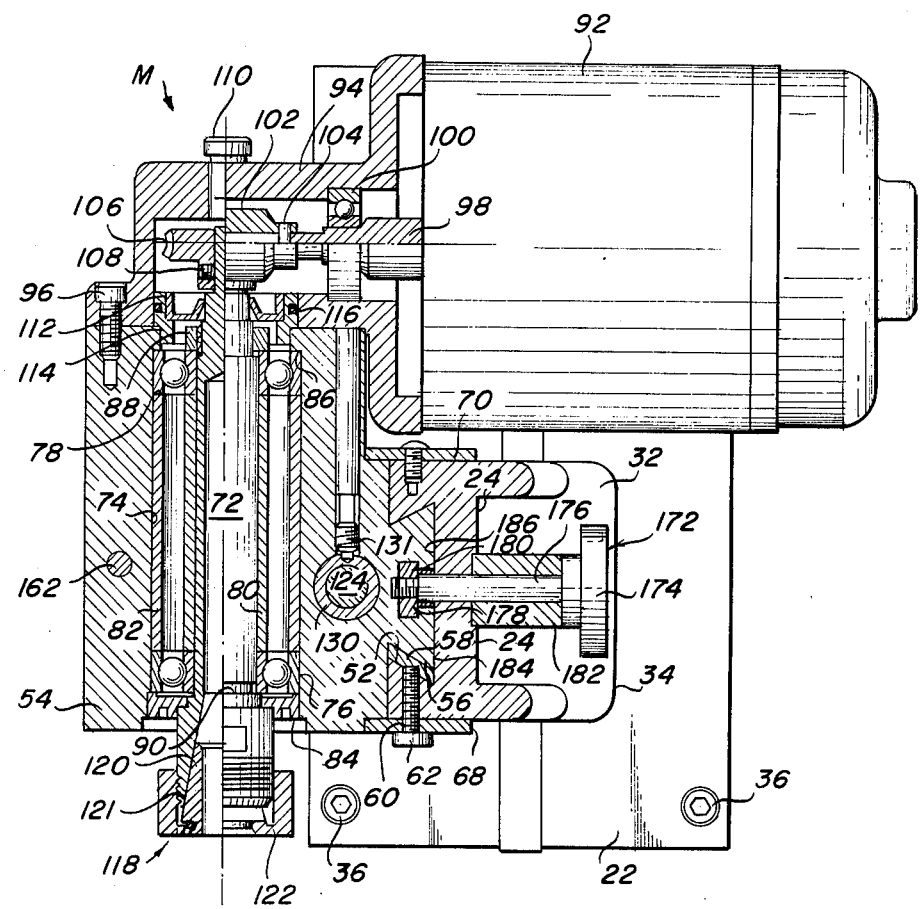
FIG. 4 is a sectional view of FIG. 3 taken along line 4—4 and viewed in the direction of the arrows.

With particular reference to FIGS. 3 and 4, the details of the milling attachment M will be described. The attachment M includes a base 22 and a vertical column secured thereto by means of T-bolt 26 which is received within a T-shaped slot 28 within base 22. Nut 30 is threaded onto bolt 26 and tightened against the horizontal surface 32 of the supporting column base 34. The base 22 in turn is bolted to cross slide 10 by means of bolts such as 36. To prevent the attachment M from turning on its base 22, base 22 is provided with a second slot 38 to accommodate a pair of keys 40 and 42. The keys 40 and 42 are bolted to the base of supporting column 24 by screws 43 and 45. In order that the attachment may be slid back out of the way when not in use, the slots 28 and 38 extend the length of base 22.

The supporting column 24 comprises a rib reinforced vertical portion 44 to which is attached a top plate 46 by means of screws 48 and 50 and further includes a vertical dovetail slot 52 extending the entire length of vertical portion 44. A spindle block 54 is secured to vertical supporting column 24 for vertical rectilinear movement by means of an integral dovetail 56 which is slideably received in slot 52. In order to assure accurate settings and rigidity during the milling operations and to compensate for wear, an adjustable gib 58 is provided within dovetail slot 52; adjustment of the gib 58 is achieved by means of screws 60 which are threaded into vertical supporting column 24 and locked by means of nuts 62. By this means, the gib 58 may be tightened against dovetail 56 to eliminate play and looseness between the dovetail 56 and its mating slot 52. Dowels 64 and 66 hold the gib 58 against vertical movement. To protect the dovetail against metal shavings and chips, coolant and other foreign matter, a pair of protective strips 68 and 70 are secured to vertical column 24 and cover the interface between the column 24 and spindle block 54. Strip 68 may be graduated if desired.

The block 54 carries a spindle 72 which is rotatably received within horizontal bore 74, the bore 74 and spindle 72 extending alongside dovetail 56 in the forward direction. The spindle 72 is rotatably supported by means of bearings 76 and 78 and inner and outer spacers 80 and 82. The assembly comprising bearings 76 and 78 and spacers 80 and 82 are held together by means of spanner nut 84 threadedly secured to block 54 which urges the outer spacer 82 against an annular shoulder 86 located within the rear part of bore 74. The inner spacer and the inner races of bearings 76 and 78 are held together by means of nut 88 which is threadedly secured to the rear portion of spindle 72 and tightens the inner assembly against an annular shoulder 90 on the forward portion of spindle 72.

An electric motor 92 is rigidly mounted to spindle block 54 by an adaptor 94 which is bolted thereto by means of screws 96. Motor 92 has an output shaft 98 collinear with its axis of rotation and rotatably received within adaptor 94 through bearing 100. A worm 102 is fastened on the end of output shaft 98 by pin 104 and meshes with worm gear 106 which in turn is rigidly connected to the rear portion of spindle 72 by means of screw 108. By means of this gearing, the rotation of motor output shaft 98 which has a horizontal axis of rotation extending along another side of dovetail 56, 52, is transferred to spindle 72 which has an axis of rotation perpendicular to the axis of rotation of the motor 92 and its output shaft 98. To provide proper lubrication for the gears 102 and 106, adaptor 94 may be filled with an appropriate oil through filler plug 110. Seals 112, pilot 114 and O-ring 116 seal the lubricating oil within adaptor 94.

The forward portion of spindle 72 extends out of block 54 and is provided with a positive grip, stub type tool collet 118 having a plurality of locking taper jaws 120 which are closed as they are drawn rearwardly against the tapered internal surface 121 of spindle 72 through the action of collet nut 122. In a customary manner, a milling tool or any other appropriate tool may be gripped by the collet 118 which is rotated by spindle 72. It is believed that this arrangement whereby the spindle 72 and motor 92 lie within a horizontal plane and have their respective axes of rotation extending perpendicularly to each other result in a balanced configuration whereby less stress is placed on the dovetail 56, 52 and furthermore which results in a compact unit which is adapted to a wide variety of sizes and configurations of lathes and which does not interfere with normal lathe operations when slid back out of position.

The spindle block 54, spindle 72, gearing 102, 106 and motor 92 are raised and lowered as a unit by means of feed screw 124 through the threaded connection within block 54 comprising internally and externally threaded nut 126, lock nut 128, internally threaded nut 130 and self-locking dog point set screw 131. In a well known manner, the nuts 126 and 130 may be adjusted relative to each other and to feed screw 124 to reduce play between the threads of nuts 126 and 130 and screw 124. Also, any wear on the threads may be compensated for by readjusting the nuts 126 and 130.

The feed screw 124 which extends through spindle block 54 is rotatably secured to an end cap 132 by means of bearings 134 and 136 tightened against an annular shoulder 138 on end cap 132 by spanner nut 140. End cap 132, in turn, is rigidly secured to top plate 46 by screws 142 and 144. A dial assembly is provided on end cap 132 and comprises an annular dial 146 positioned around the upper reduced portion 148 of feed screw 124 and urged against the inner races of bearings 134 and 136 by plate 150 and nut 152, the latter being threadedly secured to the upper portion 148 of spindle 124. A zero ring 154 is positioned around end cap 132 and held against movement by set screw 156. Dial 146 may be zeroed by loosening threaded plug 158 and then rotating the dial 146 to the desired position. Feed screw 124 is provided with a hand crank 160 so that the spindle block 54 may be raised and lowered to the desired position. A guide rod 162 is rigidly secured to top plate 46 by set screw 164 and extends through spindle block 54 to stabilize the same in the horizontal plane. A flexible plastic or leather U-shaped way cover 166 is secured to top plate 46 and spindle block 54 by screws 168 and 170 and serves to protect the feed screw 124 and dovetail slide 52, 56 from flying metal chips and other foreign matter. The way cover 166 extends around three sides of feed screw 124, the fourth side being protected by vertical column 24. Since the cover 166 is pleated, it is able to expand and contract as the spindle block is raised and lowered.

A hand operated locking clamp 172 is provided for the purpose of locking the spindle block 54 at a selected vertical position during the milling operation. The clamp 172 comprises a hand knob 174, a reduced shaft 176 which passes through vertical column 24 into dovetail slot 52 and then into a vertical T-slot 178 within dovetail 56. A T-nut 180 is slideably received within T-slot 178 so that spindle block 54 is able to slide over the nut 180 in the vertical direction. To lock the spindle block 54 at a desired vertical position, hand knob 174 is rotated in the clockwise direction thereby clamping vertical column 24 and dovetail 56 between T-nut 180 and lock spacer 182. The advantage to this arrangement is that there is no distortion of the mating parts during tightening because the flat rear surface 184 of dovetail 56 is drawn rearwardly against the flat rear surface 186 of dovetail slot 52 in a manner whereby the pressures and forces are equalized. Because of this, accurate positioning of the spindle may be achieved, the spindle block 54 will be rigidly held in position and undue wear of the mating parts is minimized. Furthermore, locking of the spindle block may be done rapidly and easily by hand without the use of a wrench.

Figure 5:
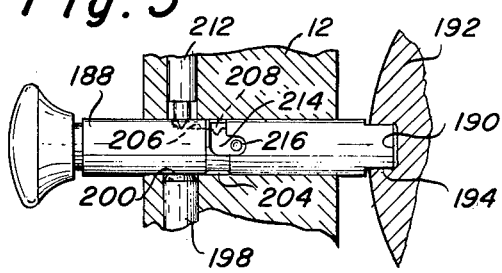
FIG. 5 is an enlarged fragmentary sectional view of the interlock mechanism illustrated in FIG. 2 and wherein the pin is in engagement with one of the notches on the headstock spindle assembly.
Figure 6:
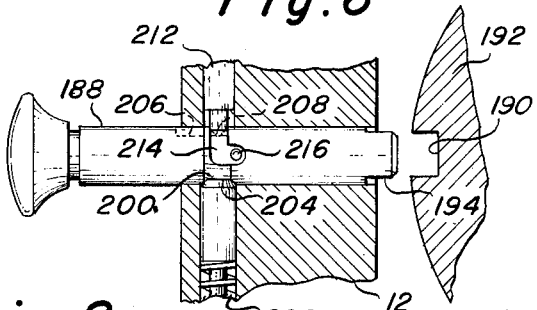
FIG. 6 is the pin of FIG. 5 shown in a second position wherein the headstock spindle assembly is disengaged and the headstock spindle motor enabled.
Figure 7:
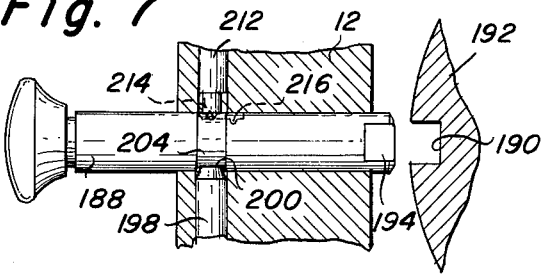
FIG. 7 is the pin of FIGS. 5 and 6 in the longitudinal position of FIG. 6 but rotated 90° on a counterclockwise direction.
Figure 12:
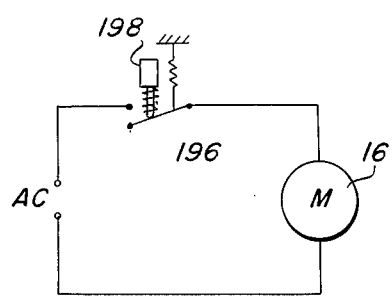
FIG. 12 is a schematic representation of the spindle safety interlock.

As a safety measure, it has been found desirable to prevent the starting of the lathe spindle motor 16 while the milling attachment M is in use. With particular reference to FIGS. 2, 5-7 and 12, the interlock mechanism forming a part of the present invention is illustrated. As in prior art machines, the headstock 12 may be provided with a pin 188 which is slideably received therein and which is individually aligned with a number of notches 190 spaced around the periphery of the spindle assembly 192. Under normal practice, the pin has two positions: the first whereby its forward end 194 is disposed within one of the notches 190 thereby mechanically locking it against rotation as illustrated in FIG. 5, and the second as illustrated in FIG. 6 wherein the pin 188 is withdrawn from notch 190 thereby permitting it to rotate freely. To provide an interlock for the spindle motor 16, a normally closed microswitch 196 is mechanically linked to pin 188 through spring biased switch plunger 198 which has a rounded upper surface 200 and which is urged against pin 188 by means of spring 202. When pin 188 is in the position shown in FIG. 6, the upper surface 200 of plunger 198 rests within groove 204 and the microswitch 196 is closed thereby completing the circuit connection between the source of power and spindle motor 16. When the pin 188 is in the position illustrated in FIG. 5, groove 204 is moved beyond plunger 198 and switch 196 is opened as the rear cam surface of groove 204 rides over the rounded end of plunger 198 thereby depressing same and opening switch 196. FIG. 12 is a schematic representation of the electrical connection resulting when pin 188 is in the position of FIG. 5. In order to hold pin 188 in the desired position, it is preferably provided with a longitudinal slot 206 having small recess 208. A piloted set screw 212 extends into slot 206 and the tip is retained within recess 208 thereby functioning as a detent mechanism.

Figure 8:
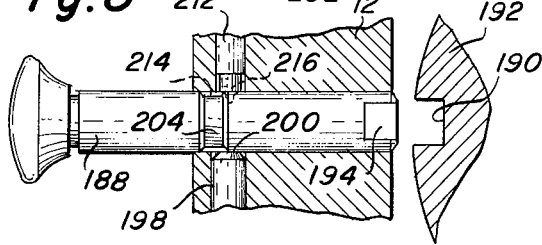
FIG. 8 is the pin of FIGS. 5, 6 and 7 in its third position where the headstock spindle assembly is released and the headstock spindle motor is again disabled.

The improvement in this interlock device comprises the addition of a second longitudinal slot 214 having a recess or depression 216 and spaced annularly from slot 206 but contiguous with groove 214 thereby permitting pin 188 to be moved to any one of three positions. To move pin 188 from the motor enabled/spindle free position illustrated in FIG. 6 to the position illustrated in FIG. 8 whereby the spindle 192 is free to turn but the motor is disabled, pin 188 is first rotated 90° counterclockwise to the position shown in FIG. 7 and then pulled out from the spindle such that pilot screw 212 engages the recess 216 within second slot 214. With pin 188 in this position, the spindle 192 is free to rotate but the motor 16 is disabled because the second cam surface of groove 204 rides over the end of plunger 198 thereby depressing same and opening switch 196.

The purpose of the three position interlock switch is as follows. When it is desired to change collets, collet inserts or workpieces, the pin 188 is placed in the position illustrated in FIG. 5 thereby mechanically locking the spindle 192 and disabling its motor 16. This prevents any injury to the operator should the machine accidentally be started during such a changeover operation. When it is desired to rotate the spindle in the normal manner, for example during standard lathe operations, the pin is pulled to the position illustrated in FIG. 6 thereby mechanically releasing the spindle 192 and closing microswitch 196. When it is desired to perform a milling operation on a stationary workpiece, pin 188 is turned counterclockwise and then pulled to its third position thereby disabling motor 16 but permitting spindle 192 to be rotated to index the workpiece as desired. To hold the workpiece during milling, the spindle brake (not shown) is utilized.

To assist in accurately indexing the spindle 14, an index ring 220 may be attached to the headstock 12 concentrically with spindle 14. The index ring 220 is provided with suitable graduations 222 on its face within one quadrant. The appropriate degree of angular displacement is read with reference to the four index lines 224 inscribed on the movable spindle assembly 14.

In order to perform in line milling operations in addition to across line milling operations, an auxiliary face milling spindle assembly 226 may be mounted to the front face of spindle block 54 as illustrated in FIGS. 9, 10 and 11.

The face spindle assembly comprises a housing 228 within which an auxiliary spindle 230 is rotatably received. The forward end 232 of the spindle is externally threaded so as to accommodate the stub type collet 118 described in conjunction with the previous figures. The spindle 230 is rotatably mounted within a bore 234 by means of bearings 236 and 238 spacer 240, washer 242 and gear 244, the entire assembly being held together by means of nut 246 and set screw and plug 248 and spindle nut 250. The spindle 230 is driven by a gear assembly 252 which comprises gear 254, taper plug 256 adapted to fit directly into the collet seat 258 of spindle 72, and a locking nut 260 which draws taper plug 256 within spindle 72.

The attachment M is changed to the across lathe center line configuration by removing the collet 118 from spindle 72, mounting the separate gear assembly 252 into spindle 72 and then attaching housing 228 to the face of spindle block 54 by aligning dowel 262 with its corresponding recess 264 and then tightening screws 266 and 268 into the face of spindle block 54. With the auxiliary attachment 226 mounted in this fashion, gears 254 and 244 will mesh and the rotation of spindle 72 will be transmitted to spindle 230 and the tool 272 gripped in its collet 270 so that in line milling, drilling, etc may be performed.

The milling attachment M operates in the following manner.

The attachment M is mounted on lathe L by bolting base 22 to cross slide 10, adjusting the position of vertical supporting column 24 on base 22 by sliding it in grooves 28 and 38 and then tightening nut 122 on spindle 72 thereby closing the collet jaws 120. The workpiece may be gripped in the lathe collet 274 and held solely by this means or held between the collet 274 and the tailstock 276. By applying the internal spindle brake (not shown) for the lathe L, the workpiece may be held in the desired angular orientation. When milling or a similar operation is being performed, locking pin 188 should be in the position illustrated in FIG. 8 so that the spindle motor 16 is disabled and the spindle 14 is able to be rotated by hand to properly index the workpiece.

Vertical positioning of spindle 72 and its collet 118 is accomplished by loosening locking clamp 172 and turning hand crank 160 to thereby rotate feed screw 124 which raises or lowers spindle block 54 and motor 92 to the desired position. The vertical position may be read either off graduated protective strip 68 or dial 146. With the tool at the desired vertical elevation, locking clamp 172 may then be tightened pulling dovetail 56 against surface 186 of vertical column 24. Accurate horizontal positioning of the attachment M and movement thereof during the milling operation is accomplished by advancing the carriage 20 and cross slide 10 in the customary manner. With the attachment M in the configuration illustrated in FIG. 1, across lathe center milling operations may be performed.

Should it be desired to perform a milling, drilling, tapping, etc. operation in line with the lathe center, the auxiliary face milling attachment 226 illustrated in FIGS. 9, 10 and 11 is attached in the manner previously described. Similarly to the across lathe center line operation, vertical and horizontal positioning and movement of the tool is accomplished by hand crank 160 and advancing of the carriage 20 and cross slide 10.

While this invention has been described as having a preferred design, it will be understood that it is capable of further modification. This application is, therefor, intended to cover any variations, uses or adaptations of the invention following the general principles thereof and including such departures from the present disclosure as come within known or customary practice in the art to which this invention pertains and as may be applied to the essential features hereinbefore set forth and fall within the scope of this invention or the limits of the appended claims.

We claim:

1. In combination with a lathe including a headstock, a lathe spindle assembly received within said stock, a carriage and a cross-slide; a milling attachment comprising:
   a base secured to said cross-slide,
   a vertical support column attached to said base and including a first interlocking element,
   a block having a second interlocking element in interfitting engagement with said first element and movable relative thereto in the vertical direction,
   a tool carrying spindle rotatably received in said block and extending horizontally along one side of said supporting column in a first direction,
   a motor mounted to said block and positioned adjacent said supporting column,
   said motor having an axis of rotation and an output shaft collinear therewith which are horizontal and extend perpendicularly to said first direction,
   gear means operatively connected between said motor output shaft and said spindle for rotating said spindle,
   vertical adjusting means associated with said supporting column means raising and lowering said block,
   locking means passing through said first and second interlocking elements clamping said second element to said first element to lock said block at a selected vertical position,
   an electric drive motor driving said lathe spindle assembly, and
   three position lock switch means associated with said headstock mechanically locking said lathe spindle assembly against rotation and electrically disabling said drive motor when in its first position, mechanically releasing said spindle assembly and electrically enabling said drive motor when in its second position, and mechanically releasing said spindle assembly and disabling said drive motor when in its third position.

2. The milling attachment of claim 1 and wherein said locking means comprises:
   an internal vertical slot in said dovetail,
   a nut received within said internal slot, and
   a hand screw extending through said supporting column into said dovetail and internal slot and being threadedly connected to said nut.

3. The milling attachment of claim 2 and wherein said internal slot is a T-slot and said nut is a T-nut.

4. The milling attachment of claim 2 wherein said hand screw has an enlarged head and including a lock spacer positioned around said hand screw between said enlarged head and said supporting column.

5. The milling attachment of claim 2 and including:
   a gib secured within said dovetail slot,
   means adjustably urging said gib against said dovetail to compensate for wear between said dovetail and said dovetail slot.

6. The milling attachment of claim 1 wherein said feed screw passes through said block at a point inwardly of said dovetail.

7. The milling attachment of claim 1 including an adjustable dial mounted around said feed screw for rotation in unison therewith.

8. The milling attachment of claim 1 and including a stub collet mounted on said spindle.

9. The milling attachment of claim 1 and including a face milling attachment comprising:
   a housing secured to said block and positioned over said spindle,
   a second spindle rotatably received within said housing,
   a spindle extension positioned within said housing and rigidly connected to and collinear with said first mentioned spindle, said second spindle extending along a direction perpendicular to said first direction, and second gearing means operatively connected between said spindle extension and said second spindle for rotating said second spindle about its axis.

10. The milling attachment of claim 9 and wherein said first mentioned spindle includes a tapered collet seat, said spindle extension comprises a tapered plug received within said collet seat.

11. The milling attachment of claim 1 and including:

a plate secured to said column and extending generally horizontally over said block, vertical adjusting screw means extending through said plate and said block raising and lowering said block on said column, and a cover attached to said column and extending between said plate and said block over said adjusting screw to completely enclose same thereby protecting it against chips, foreign matter, coolant and the like, said cover being pleated such that is is compressible in the vertical direction.

12. In combination with a lathe including a headstock, a lathe spindle assembly received within said headstock, a carriage and a cross-slide; a milling attachment comprising:

a base secured to said cross-slide, a vertical support column attached to said base and including a first interlocking element, a block having a second interlocking element in interfitting engagement with sais first element and movable relative thereto in the vertical direction, a tool carrying spindle rotatably received in said block and extending horizontally along one side of said supporting column.

a motor mounted to said block, means operatively connected between said motor and said spindle for rotating said spindle, vertical adjusting means associated with said supporting column means raising and lowering said block, locking means passing through said first and second interlocking elements clamping said second element to said first element to lock said block at a selected vertical position, an electric drive motor driving said lathe spindle assembly, and three position lock switch means associated with said headstock mechanically locking said lathe spindle assembly against rotation and electrically disabling said drive motor when in its first position, mechanically releasing said spindle assembly and electrically enabling said drive motor when in its second position, and mechanically releasing said spindle assembly and disabling said drive motor when in its third position.

13. The combination of claim 12 wherein said spindle assembly includes a plurality of circumferentially spaced notches and said lock switch means comprises:

a pin longitudinally slideable within said headstock and aligned individually with said notches, mechanically actuated electric switch means associated with said headstock for connecting and disconnecting said drive motor, a switch operating plunger connected between said pin and said electric switch means, said pin including cam surfaces engageable with said plunger.

14. The combination of claim 13 and wherein said lock switch means includes detent means for locking said pin in one of said first, second or third positions.

15. The combination of claim 12 and wherein said supporting column is horizontally adjustable on said base.

* * * * *